US011682420B2

(12) United States Patent
Freitag et al.

(10) Patent No.: US 11,682,420 B2
(45) Date of Patent: Jun. 20, 2023

(54) SEED LAYER FOR SPIN TORQUE OSCILLATOR IN MICROWAVE ASSISTED MAGNETIC RECORDING DEVICE

(71) Applicant: Western Digital Technologies, Inc., San Jose, CA (US)

(72) Inventors: James Mac Freitag, Sunnyvale, CA (US); Zheng Gao, San Jose, CA (US); Susumu Okamura, San Jose, CA (US); Brian R. York, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 38 days.

(21) Appl. No.: 17/463,358

(22) Filed: Aug. 31, 2021

(65) Prior Publication Data

US 2021/0390977 A1 Dec. 16, 2021

Related U.S. Application Data

(63) Continuation of application No. 16/450,857, filed on Jun. 24, 2019, now Pat. No. 11,127,420.

(Continued)

(51) Int. Cl.
*G11B 5/31* (2006.01)
*G11B 11/105* (2006.01)
(Continued)

(52) U.S. Cl.
CPC ........ *G11B 5/314* (2013.01); *G11B 11/10539* (2013.01); *G11B 2005/0024* (2013.01);
(Continued)

(58) Field of Classification Search
None
See application file for complete search history.

(56) References Cited

U.S. PATENT DOCUMENTS 6,222,707 B1 4/2001 Huai et al.
8,488,373 B2 7/2013 Zhang et al.
(Continued)

FOREIGN PATENT DOCUMENTS

CN 104835510 B 11/2017
JP 2013251042 A 12/2013
WO 2015126326 A1 8/2015

OTHER PUBLICATIONS

Iwasaki , H., IEEE Trans. Jour. on Mag. in Japan, v5(6), 1990, pp. 515-521. (Year: 1990).*

(Continued)

*Primary Examiner* — Kevin M Bernatz
(74) *Attorney, Agent, or Firm* — Patterson + Sheridan, LLP; Steven H. VerSteeg

(57) ABSTRACT

Certain embodiments are directed to a spin torque oscillator (STO) device in a microwave assisted magnetic recording (MAMR) device. The magnetic recording head includes a seed layer, a spin polarization layer over the seed layer, a spacer layer over the spin polarization layer, and a field generation layer is over the spacer layer. In one embodiment, the seed layer comprises a tantalum alloy layer. In another embodiment, the seed layer comprises a template layer and a damping reduction layer over the template layer. In yet another embodiment, the seed layer comprises a texture reset layer, a template layer on the texture reset layer, and a damping reduction layer on the template layer.

19 Claims, 7 Drawing Sheets

Related U.S. Application Data

(60) Provisional application No. 62/727,814, filed on Sep. 6, 2018.

(51) Int. Cl.
  *H01F 10/30* (2006.01)
  *H01F 10/32* (2006.01)
  *G11B 5/00* (2006.01)

(52) U.S. Cl.
  CPC ............ *H01F 10/30* (2013.01); *H01F 10/329* (2013.01); *Y10T 428/11* (2015.01); *Y10T 428/1193* (2015.01)

(56) References Cited

U.S. PATENT DOCUMENTS

| | | |
|---|---|---|
| 8,582,240 B1 | 11/2013 | Chen et al. |
| 9,230,569 B1 | 1/2016 | Shimoto et al. |
| 9,230,571 B1 | 1/2016 | Chen et al. |
| 9,275,672 B2 | 3/2016 | Shiroishi et al. |
| 9,355,655 B1 | 5/2016 | Udo et al. |
| 9,368,135 B2 | 6/2016 | Gao |
| 9,558,765 B2 | 1/2017 | Zhang et al. |
| 9,728,210 B2 | 8/2017 | Okamura et al. |
| 9,881,637 B1 | 1/2018 | Wilson et al. |
| 10,121,497 B1 | 11/2018 | Takahashi et al. |
| 10,186,284 B2 | 1/2019 | Narita et al. |
| 10,236,021 B2 | 3/2019 | Narita et al. |
| 10,276,193 B2 | 4/2019 | Narita et al. |
| 10,325,618 B1 | 6/2019 | Wu et al. |
| 10,366,714 B1 | 7/2019 | Olson et al. |
| 2007/0243638 A1 | 10/2007 | Horng et al. |
| 2008/0304176 A1 | 12/2008 | Takagishi et al. |
| 2009/0059423 A1 | 3/2009 | Yamada et al. |
| 2009/0174968 A1 | 7/2009 | Singleton et al. |
| 2009/0213503 A1 | 8/2009 | Sun et al. |
| 2009/0310244 A1 | 12/2009 | Shimazawa et al. |
| 2010/0119874 A1 | 5/2010 | Zhang et al. |
| 2011/0007427 A1 | 1/2011 | Qiu et al. |
| 2013/0250456 A1 | 9/2013 | Yamada et al. |
| 2014/0139952 A1 | 5/2014 | Takeo et al. |
| 2014/0177100 A1 | 6/2014 | Sugiyama et al. |
| 2014/0203383 A1 | 7/2014 | Guo |
| 2014/0210022 A1 | 7/2014 | Quan et al. |
| 2016/0027455 A1 | 1/2016 | Kudo et al. |
| 2016/0118065 A1 | 4/2016 | Chen et al. |
| 2016/0218728 A1 | 7/2016 | Zhu |
| 2017/0148474 A1 | 5/2017 | Okamura et al. |
| 2017/0236537 A1 | 8/2017 | Murakami et al. |
| 2017/0365282 A1* | 12/2017 | Okamura .............. G11B 5/1278 |
| 2018/0025746 A1* | 1/2018 | Okamura ............... G11B 5/235 360/125.01 |
| 2018/0268848 A1 | 9/2018 | Narita et al. |
| 2019/0088274 A1 | 3/2019 | Narita et al. |
| 2019/0279666 A1 | 9/2019 | Freitag et al. |
| 2019/0279667 A1 | 9/2019 | Freitag et al. |
| 2019/0279668 A1 | 9/2019 | Freitag et al. |

OTHER PUBLICATIONS

Mallary et al. "Head and Media Challenges for 3 Tb/in$^2$ Microwave-Assisted Magnetic Recording," IEEE Transactions on Magnetics, vol. 50, No. 7, Jul. 2014, 8 pages.

Tagawa et al. "Advantage of MAMR Read-Write Performace," IEEE Transactions on Magnetics, vol. 52, No. 9; Sep. 2016, 4 pages.

Tantalum pentoxide Wikipedia page, Year: 2021, Accessed May 18, 2021, 6 pages.

* cited by examiner

SEED LAYER FOR SPIN TORQUE OSCILLATOR IN MICROWAVE ASSISTED MAGNETIC RECORDING DEVICE

CROSS-REFERENCE TO RELATED APPLICATIONS

This application is a continuation of U.S. Pat. No. 11,127,420, issued on Sep. 21, 2021, which application claims the benefit of U.S. Provisional Patent Application Ser. No. 62/727,814, filed Sep. 6, 2018, each of which is herein incorporated by reference.

BACKGROUND

Field of the Disclosure

Embodiments of the present disclosure generally relate to data storage devices, and more specifically, to a magnetic media drive employing a spin torque oscillator in a microwave-assisted magnetic recording (MAMR) device.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 1 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording head at an air bearing surface of the recording medium. As the main pole becomes smaller, the recording field becomes smaller as well, limiting the effectiveness of the magnetic recording head.

Heat-assisted magnetic recording (HAMR) and microwave assisted magnetic recording (MAMR) are two types of energy-assisted recording technology to improve the recording density of a magnetic recording medium, such as a hard disk drive (HDD). In MAMR, an oscillation element or device is located next to or near the write element in order to produce a high-frequency magnetic field, such as in a microwave frequency band. The high-frequency magnetic field (in addition to a recording magnetic field emanated from a main pole of the write element) reduces an effective coercivity of a magnetic recording medium used to store data and allows writing of the magnetic recording medium at lower magnetic fields emanated from the write pole. Thus, higher recording density of the magnetic recording medium may be achieved by MAMR technology.

SUMMARY

Certain embodiments are directed to a spin torque oscillator (STO) device in a microwave-assisted magnetic recording (MAMR) device. The magnetic recording head and STO comprising a seed layer, a spin polarization layer over the seed layer, a spacer layer over the spin polarization layer, and a field generation layer is over the spacer layer. In one embodiment, the seed layer comprises a tantalum alloy layer. In another embodiment, the seed layer comprises a template layer and a damping reduction layer over the template layer. In yet another embodiment, the seed layer comprises a texture reset layer, a template layer on the texture reset layer, and a damping reduction layer on the template layer.

Certain embodiments are directed to a microwave-assisted magnetic recording (MAMR) device comprising a main pole, a spin torque oscillator device, and a trailing shield over the spin torque oscillator device. The spin torque oscillator device includes a seed means. The seed means interfaces with the main pole and interfaces with a spin polarization layer of the spin torque oscillator device.

Certain embodiments are directed to a microwave-assisted magnetic recording (MAMR) device include a main pole, a spin torque layer, and a seed layer disposed between the main pole and the spin torque layer. The main pole includes a body-centered cubic (BCC) material with a random texture. The seed layer includes a nano-crystalline layer over the main pole, a hexagonal close packed (HCP) structure layer over the nano-crystalline layer, and a body-centered cubic (BCC) structure layer over the HCP structure layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The terms "over," "under," "between," "on", and other similar terms as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. The relative position of the terms does not define or limit the layers to a vector space orientation of the layers.

The term "comprises/comprising" includes the subset meaning of "consists/consisting essentially of" and includes the subset meaning of "consists/consisting of."

Certain embodiments of the present disclosure are directed to magnetic recording device including a spin torque oscillator (STO) device including a seed layer and a spin polarization layer (SPL) formed over the seed layer. In one embodiment, the seed layer comprises a texture reset layer, such as a tantalum alloy layer, having a low resistivity providing lower Joule heating of the Magnetic recording head. In another embodiment, the seed layer comprises a template layer and a damping reduction layer between the template layer and the SPL with reduced damping of the SPL lowering the critical current for SPL reversal. In yet another embodiment, the seed layer comprises a texture reset layer, a template layer over the texture reset layer, and a damping reduction layer over the template layer.

Figure 1:
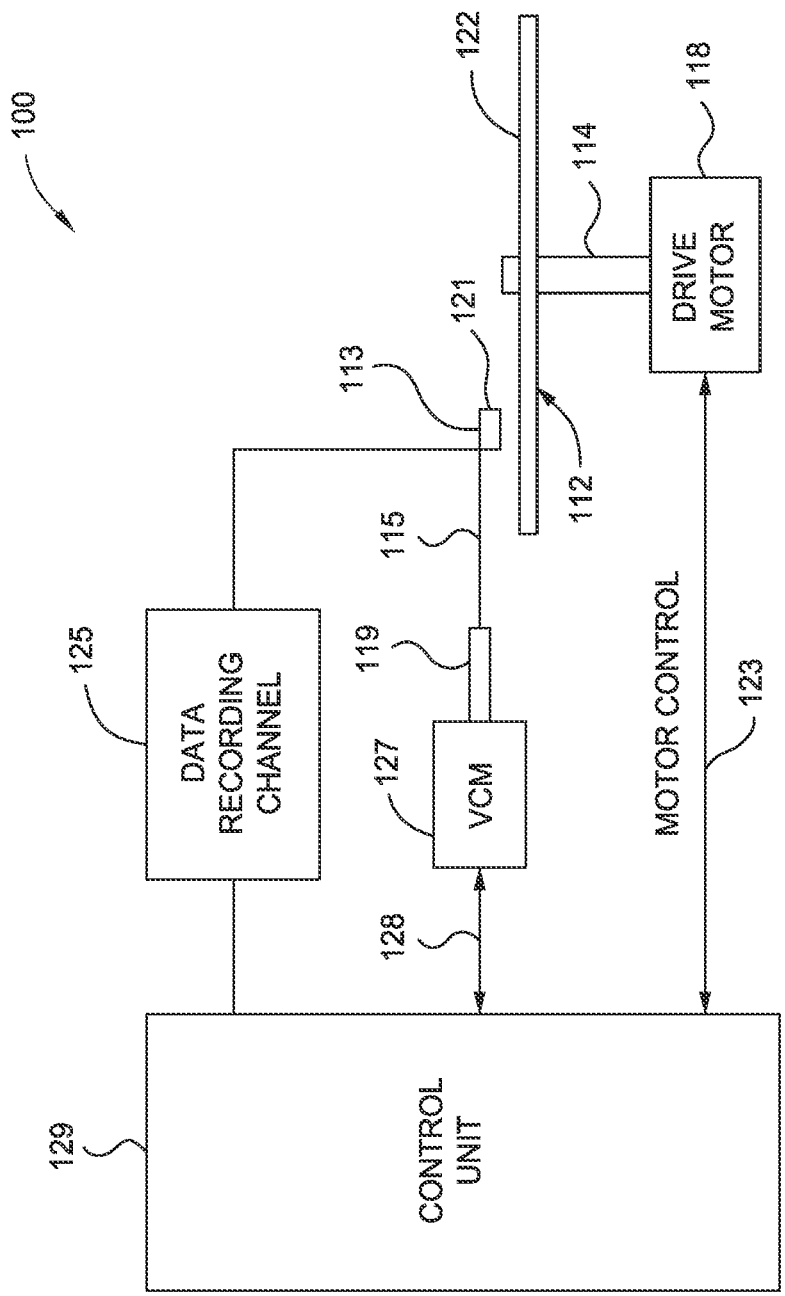
FIG. 1 is a schematic illustration of certain embodiments of a data storage device, such as a magnetic media device.

FIG. 1 is a schematic illustration of certain embodiments of a magnetic media drive including a microwave assisted magnetic recording (MAMR) head including a STO device. Such magnetic media drive may be a single drive/device or comprise multiple drives/devices. For the ease of illustration, a single disk drive 100 is shown according to one embodiment. The disk drive 100 includes at least one rotatable magnetic disk 112 supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a microwave assisted magnetic recording (MAMR) head including a STO device. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
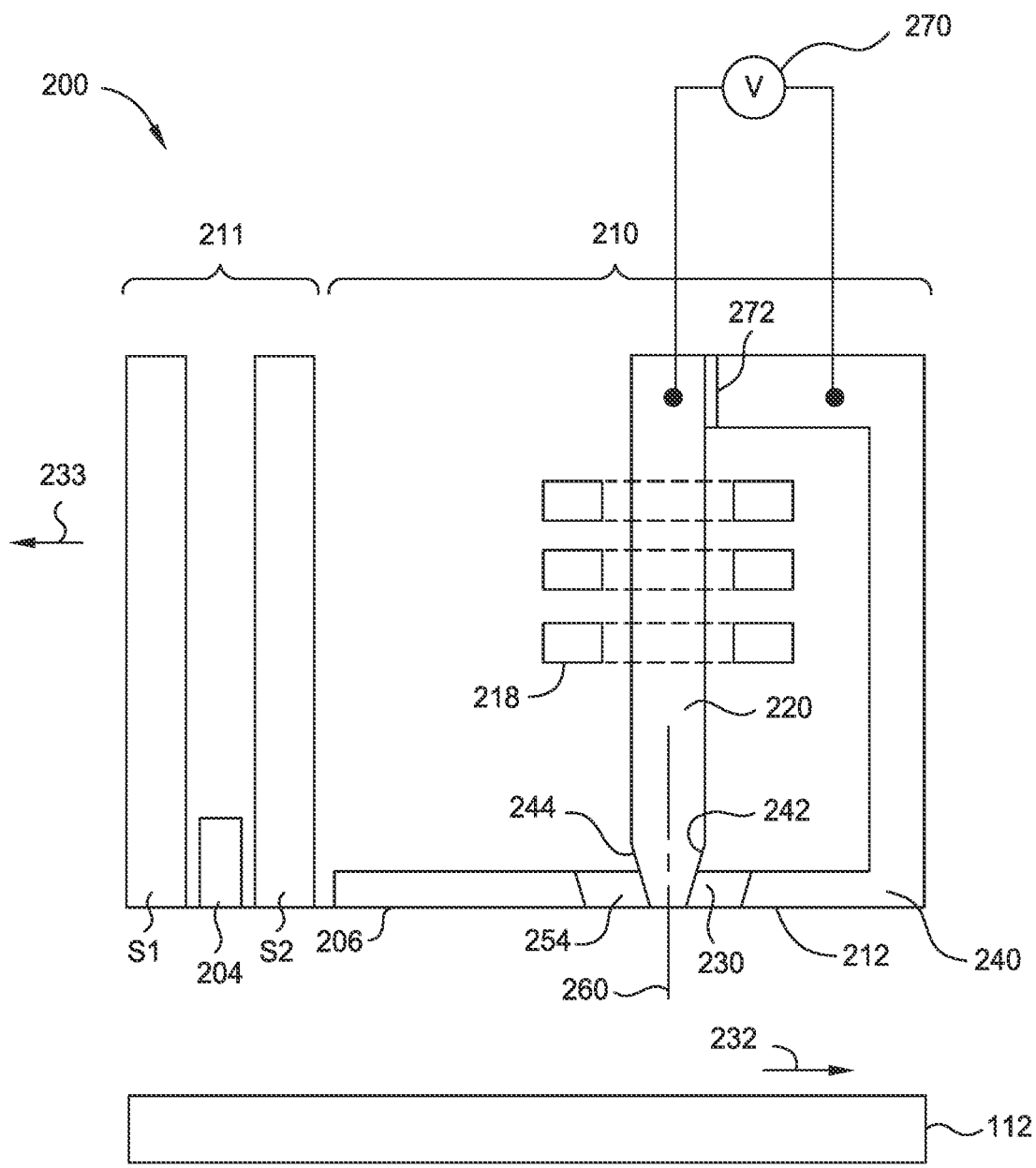
FIG. 2 is a schematic illustration of certain embodiments of a cross sectional side view of a read/write head facing a magnetic disk.

FIG. 2 is a schematic illustration of certain embodiments of a cross sectional side view of a head assembly 200 facing the magnetic disk 112. The head assembly 200 may correspond to the head assembly 121 described in FIG. 1. The head assembly 200 includes a media facing surface (MFS) 212, such as an air bearing surface (ABS), facing the disk 112. As shown in FIG. 2, the magnetic disk 112 relatively moves in the direction indicated by the arrow 232 and the head assembly 200 relatively moves in the direction indicated by the arrow 233.

In some embodiments, the head assembly 200 includes a magnetic read head 211. The magnetic read head 211 may include a sensing element 204 disposed between shields S1 and S2. In certain embodiments, the sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the magnetic disk 112, such as perpendicular recorded bits or longitudinal recorded bits, are detectable by the sensing element 204 as the recorded bits.

The head assembly 200 includes a write head 210. In certain embodiments, the write head 210 includes a main pole 220, a leading shield 206, a trailing shield 240, and a spin torque oscillator device 230 disposed between the main pole 220 and the trailing shield 240. The main pole 220 serves as a first electrode and has a front portion at the ABS.

The main pole 220 comprises CoFe alloy, such as CoFe, CoFeNi, or other suitable magnetic materials. In certain embodiments, the main pole 220 comprises small grains of magnetic materials in a random texture, such as body-centered cubic (BCC) materials formed in a random texture. For example, a random texture of the main pole 220 may be formed by electrodeposition, such as electroplating. The write head 210 includes a coil 218 around the main pole 220 that excites the main pole 220 producing a writing magnetic field structures for affecting a magnetic medium of the rotatable magnetic disk 112. The coil 218 may be a helical structure or one or more sets of pancake structures.

In certain embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown) in which the trailing side and the leading side are substantially parallel.

The trailing shield 240 is a magnetic film serving as a second electrode and return pole for the main pole 220. The leading shield 206 may provide electromagnetic shielding and is separated from the main pole 220 by a gap or dielectric material 254.

The STO device 230 is positioned proximate the main pole 220 and reduces the coercive force of the magnetic medium, so that smaller recording fields can be used to record data. An electron current is applied to STO device 230 from a power source 270 to produce a microwave field. The electron current may be a direct current (DC), pulsed DC, and/or alternating current. The STO device 230 may be electrically coupled to the main pole 220 and the trailing shield 240 in which the main pole 220 and the trailing shield are separated by an insulating layer 272. The power source 270 may provide electron current to the STO device 230 through the main pole 220 and the trailing shield 240. For direct current, the power source 270 may flow electron current from the main pole 220 through the STO device 230 to the trailing shield 240 or may flow electron current from the trailing shield 240 through the STO device 230 to the main pole 220 depending on the orientation of a spin polarization and a field generation layer of the STO device. In other embodiments, the STO device 230 may be coupled to electrical leads providing an electron current other than from the main pole and/or the trailing shield.

Figure 3:
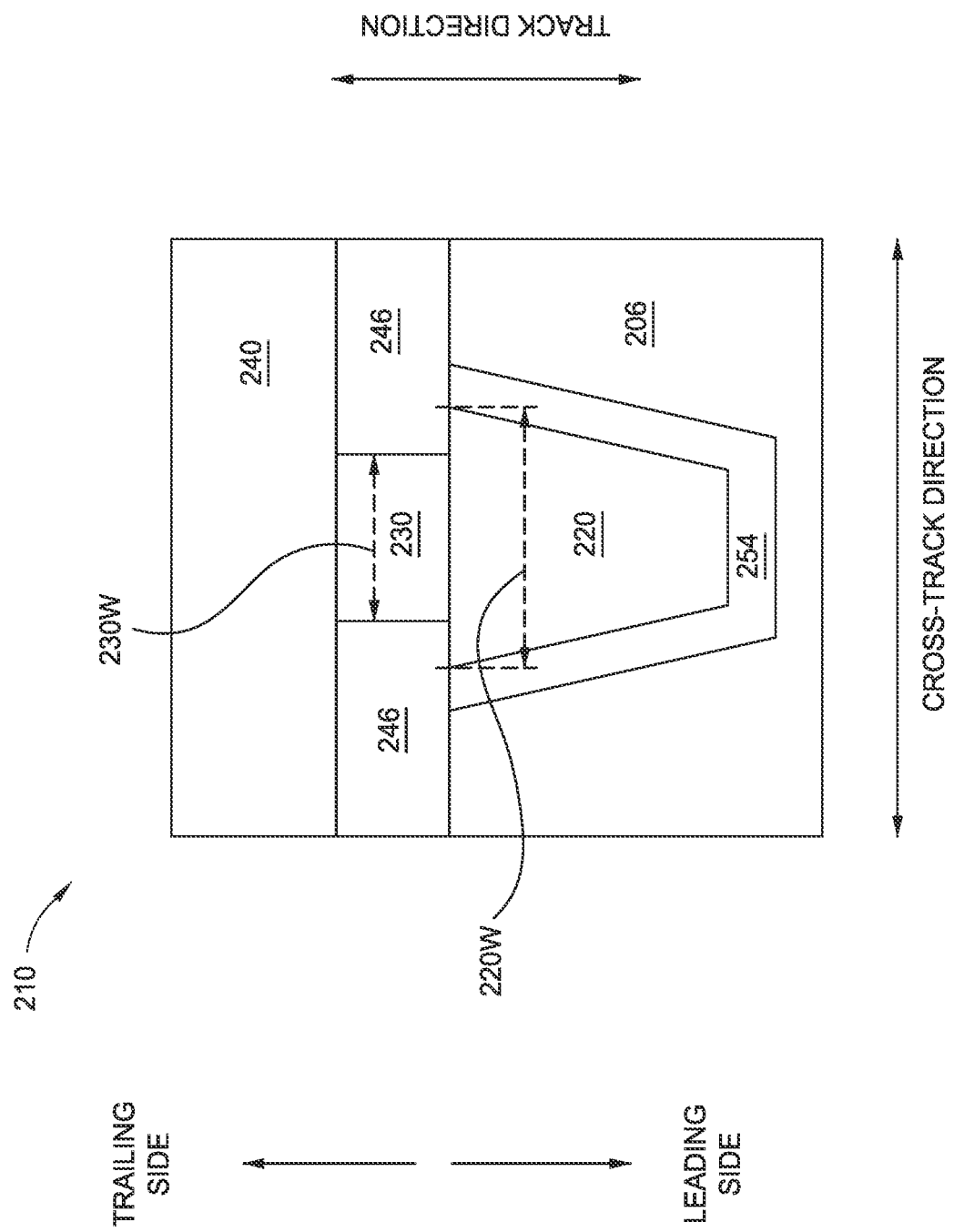
FIG. 3 is a schematic illustration of certain embodiments of a plan view of an air bearing surface of a MAMR magnetic recording head with an oscillation device between a main pole and a trailing shield in the track direction.

FIG. 3 is a schematic illustration of certain embodiments of a plan view of an air bearing surface of a MAMR head 210 of FIG. 2 with a STO device 230 between a main pole 220 and a trailing shield 240 in the track direction. The main pole 220 of the MAMR magnetic recording head 210 may be any suitable shape (i.e., trapezoidal, triangular, etc.) and suitable dimensions. The STO device 230 may be formed to any suitable shape, any suitable dimension, and any suitable position between the main pole 220 and the trailing shield 240. For example, the width 230W of the STO device 230 may be greater than, equal to, or less than the width 220W of the main pole 220 at the interface with the STO device 230.

The leading shield 206 may be positioned on one or more sides of the main pole 220 with the leading gap 254 therebetween. A side gap 246 may be positioned on the sides of the STO device 230. The leading gap 254 and the side gap 246 may comprise an insulating material.

Figure 4:
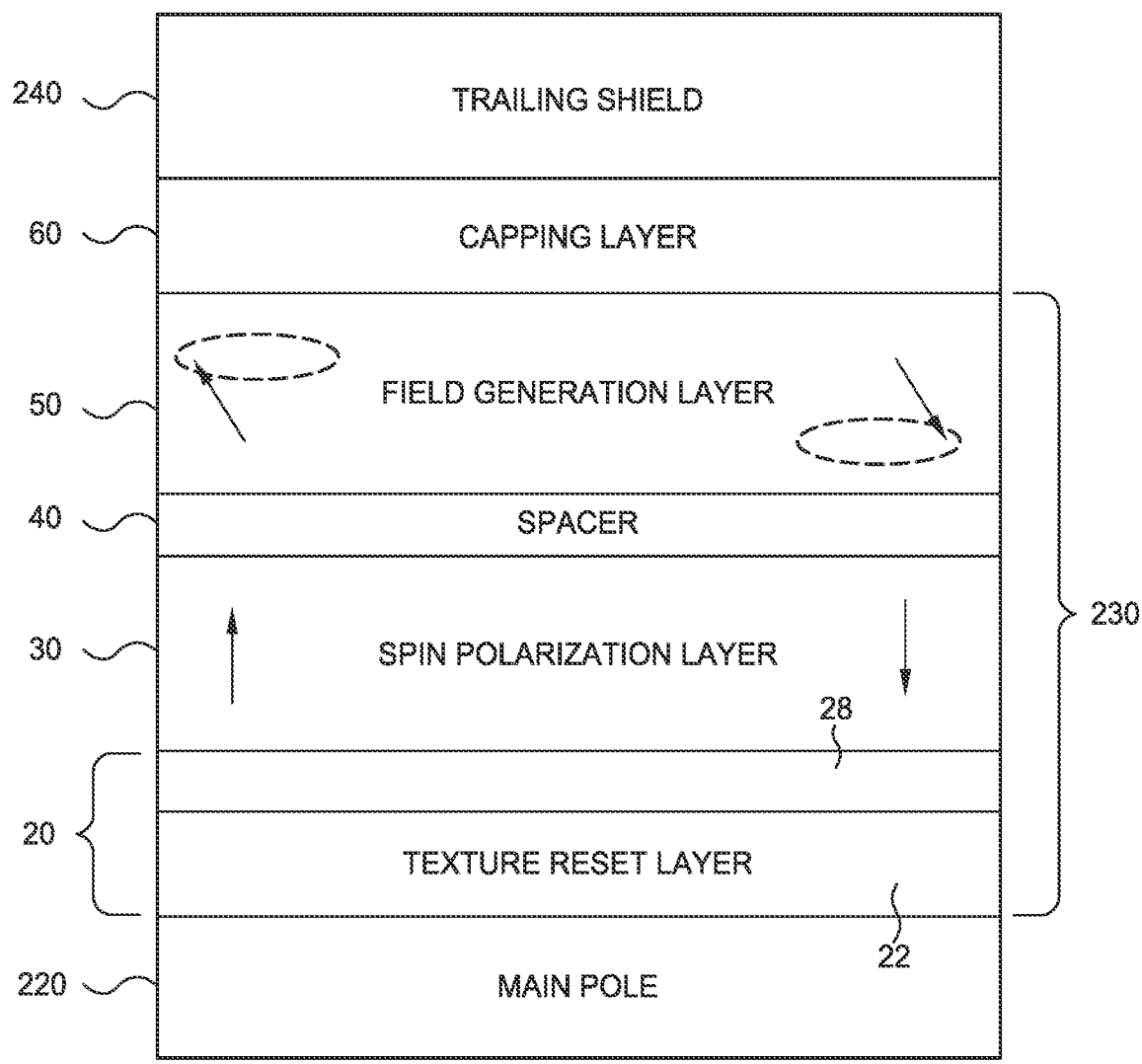
FIG. 4 is a schematic plan view of an air bearing surface of one embodiment of a magnetic recording head of FIG. 2 and FIG. 3 in which the magnetic recording head comprises a seed layer, such as a tantalum alloy seed layer.

FIG. 4 is a schematic plan view of an air bearing surface of one embodiment of a STO device 230 of FIG. 2 and FIG. 3 in which the STO device 230 comprises a seed layer 20, such as a tantalum alloy seed layer. The STO device 230 includes the seed layer 20 over or on the main pole 220, a spin polarization layer (SPL) 30 over or on the seed layer 20, a spacer layer 40 over or on the SPL 30, and a field generation layer (FGL) 50 over or on the spacer layer 40.

In certain embodiments, the seed layer 20 comprises a texture reset layer 22 on the main pole 220. The texture reset layer 22 resets or provides a texture break for the growth of the SPL 30 over the texture reset layer 22 for low structural defects of the SPL 30. Low structural defects of the SPL 30 results in low coercivity in magnetization reversal of the SPL 30, lower critical current for reversal of the SPL 30, and better yield in the formation of the SPL 30. If an SPL is directly formed on a main pole, such as CoFe alloy comprising a body-centered cubic (BCC) material formed in a random texture, the SPL would undesirably have a high amount of structural defects since the random texture of the main pole is a poor surface for formation of the SPL. The seed layer 20 may further comprise one or more optional additional layers 28 between the texture reset layer 22 and the SPL 30.

In certain embodiments, the SPL 30 comprises NiFe, CoFe, CoFeNi, CoMnGe, NiCo, NiFeCu, CoFeMnGe, CoMnSi, CoFeSi, other high magnetic anisotropy materials, other Heusler alloys, other suitable magnetic layers, and multiple layers thereof. The SPL 30 can comprise a material having magnetic anisotropy oriented in a direction longitudinal to the film plane of the SPL 30 or perpendicular to the film plane of the SPL 30. The SPL 30 transmits spin torque to the FGL 50 causing oscillation of the magnetization of the FGL 50 at high velocity in a plane to thereby generate a high-frequency magnetic field, such as a microwave field. The magnetization of the SPL 30 is reversed to switch the oscillation direction of the magnetization of the FGL 50 to establish a consistent microwave field when the recording field is changed from the switch in polarization of the write pole 220 for low write errors.

The STO device 230 comprises a spacer layer 40 between the SPL 30 and the FGL 50. The spacer layer 40 includes one or more non-magnetic materials, such as Au, Ag, Pt, Ta, Ir, Al, Si, Ge, Ti, Cu, Pd, Ru, Mo, W, AgSn, alloys thereof, and multiple layers thereof. The spacer layer 40 may reduce exchange coupling between the SPL 30 and the FGL 50. The spacer layer 40 may be made of a material having a high spin transmissivity for spin torque transfer from the SPL 30 to the FGL 50.

FGL 50 may include FeCo, NiFe, CoPt, CoCr, Coir, CoFeAli, CoFeGe, CoMnGe, CoFeAl, CoFeSi, CoMnSi, TbFeCo, other magnetic materials, and multiple layers thereof. Spin torque transmitted from the SPL 30 to the FGL 50 causes oscillation of the magnetization of the FGL 50 generating a microwave field (a high-frequency magnetic field). The recording magnetic field applied from the main pole 220 to the STO device 230 maintains the magnetization direction of the SPL 30 and the FGL 50 so that the FGL 50 can oscillate to produce a microwave field. When an electron current flows through the STO device 230 from the seed layer 20 to the spin polarization layer 30, such as from the main pole 220 to the trailing shield 240, the electrons passing through the SPL 30 are polarized. The stream of polarized electrons from the SPL 30 to the FGL 50 imparts a spin torque to the field generation layer 50 causing the FGL 50 to emit a high-frequency magnetic field to the magnetic recording medium reducing the coercive force of the recording medium and reducing the switch field threshold.

In certain embodiments, the texture reset layer 22 of the seed layer 20 comprises a tantalum alloy layer. The tantalum alloy layer provides a nano-crystalline structure formed over the random texture of the main pole 220. The nano-crystalline structure of the tantalum alloy layer provides a smooth surface for formation of structured layers or crystalline layers thereover with low structure/crystal defects. A seed layer 20 comprising a tantalum alloy layer has reduced Joule heating in comparison to a tantalum layer of pure or substantially pure tantalum. The tantalum alloy layer has a lower resistance than a tantalum layer of pure or substantially pure tantalum. A tantalum layer of pure or substantially pure tantalum would undesirably cause additional joule heating of the STO device 230 decreasing reliability of the STO device 230.

In certain embodiments, the texture reset layer 22 comprises a tantalum alloy containing an atomic percent content of tantalum in a range from 20% to 50%, such as in a range from 25% to 35%. A tantalum alloy layer comprising an atomic percent content of tantalum of over 50% may undesirably have a high resistivity that provides high Joule heating. A tantalum alloy comprising an atomic percent content of lower than 20% may undesirably form a surface having poor texture for interfacing with the SPL 30 of for forming an adjacent layer(s) to the SPL 30.

In certain embodiments, the texture reset layer 22 comprises a tantalum alloy of tantalum and a metal selected from a group consisting of nickel, iron, and combinations thereof. For example, the tantalum alloy may be NiTa, FeTa, or NiFeTa. In certain embodiments, the texture reset layer 22 comprises NiTa with tantalum in an atomic percent content in a range from 20% to 50% and nickel in an atomic percent content in a range from 50% to 80%. In certain embodiments, the texture reset layer 22 comprises FeTa with tantalum in an atomic percent content in a range from 20% to 50% and iron in an atomic percent content in a range from 50% to 80%. In certain embodiments, the texture reset layer 22 comprises NiFeTa with tantalum in an atomic percent content in a range from 20% to 50%, nickel in an atomic percent content in a range from 1% to 75%, and iron in an atomic percent content in a range from 1% to 75%. In certain embodiments, the texture reset layer 22 is formed to a thickness in a range from 1 nm to 6 nm.

In certain embodiments, a capping layer 60 may be on or over the STO device 230 and between the FGL 50 and the trailing shield 240. The capping layer 60 may comprise one or more magnetic layers, one or more non-magnetic layers, or combinations thereof. Examples of a non-magnetic layer of the capping layer 60 comprises Cr, Pt, Ir, Ta, Ru, Cu, other non-magnetic materials, and alloys thereof. In various embodiments, the non-magnetic capping layer can have high or low spin transmissivity. Examples of a magnetic layer of the capping layer 60 comprises may include Fe, Co, Ni, other magnetic materials, and alloys thereof. In certain embodiments, the capping layer 60 protects the STO device 230 during formation of the STO device 230 and formation of the magnetic write head 210, such as during deposition, patterning, cleaning, etc.

Figure 5:
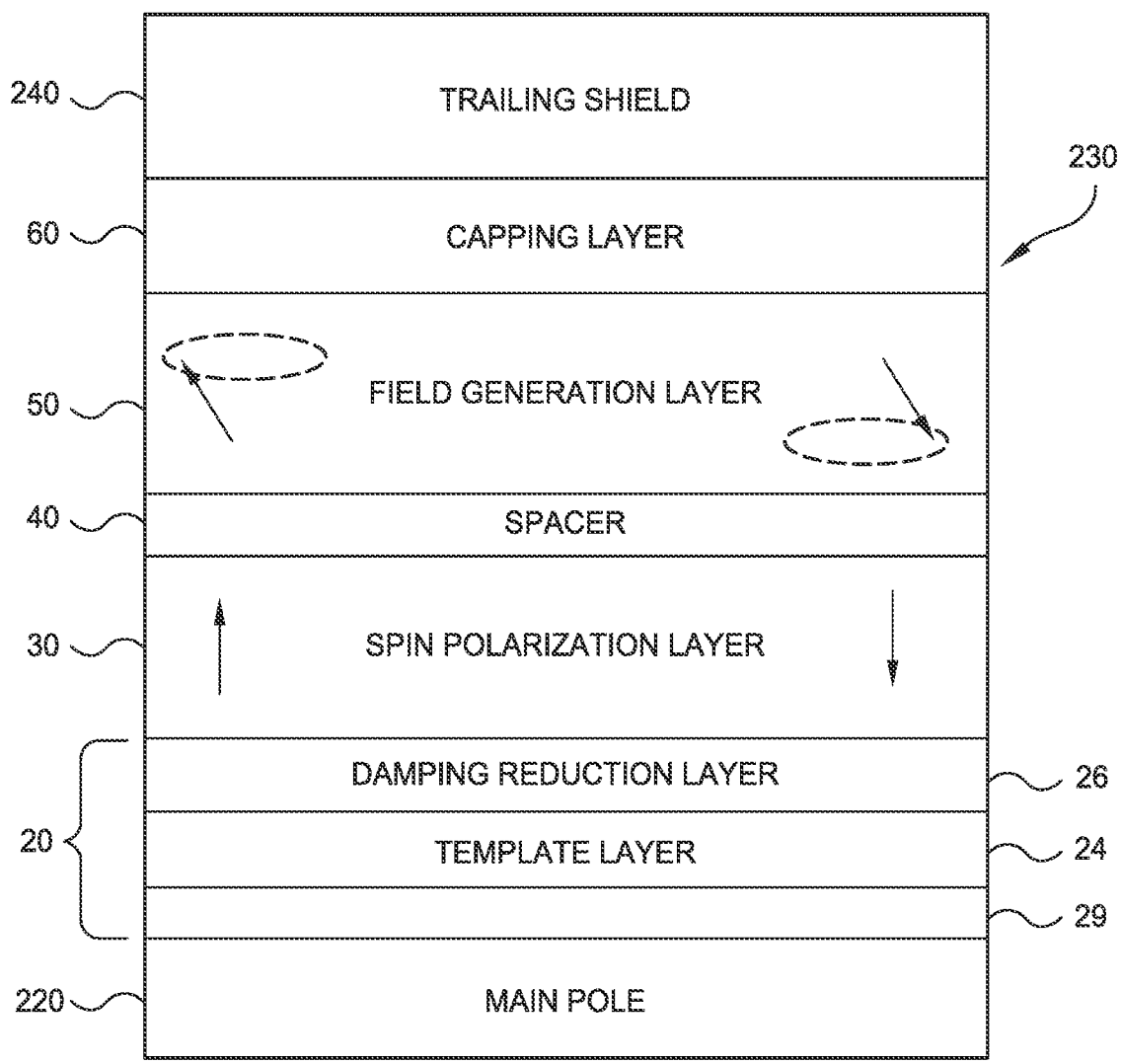
FIG. 5 is a schematic plan view of an air bearing surface of another embodiment of a magnetic recording head of FIG. 2 and FIG. 3 in which the magnetic recording head comprises a seed layer, such as a damping reduction layer.

FIG. 5 is a schematic plan view of an air bearing surface of another embodiment of a STO device 230 of FIG. 2 and FIG. 3 in which the STO device 230 comprises a seed layer 20, such as a damping reduction layer. The STO device 230 comprises a spin polarization layer (SPL) 30, a spacer layer 40, and a field generation layer (FGL) 50 similar to those discussed in reference to FIG. 4

In certain embodiments, the seed layer 20 comprises a template layer 24. The template layer 24 provides a surface for good growth of structured and/or crystalline layers such, such as face centered cubic (FCC) metal alloys, body center cubic (BCC) metal alloys, and ordered phase alloys. In certain embodiments, the template layer 24 comprises ruthenium, such as ruthenium in an atomic percent content of 95% or more, or ruthenium in an atomic percent content of 99% or more. In certain embodiments, the template layer 24 comprises ruthenium alloys, such as RuCr and RuTi. The template layer 24 of ruthenium or ruthenium alloys has a hexagonal close packed structure. The hexagonal close packed (HCP) structure provides a good template surface for growth or interfacing with a FCC layer, a BCC layer, or a Heusler layer with low structural defects. For example, a FCC layer, a BCC layer, or a Heusler alloy layer of a FGL 50 grown over the seed layer 20 has low structural defects. In certain embodiments, the template layer 24 is formed to a thickness in a range from 1 nm to 6 nm.

The seed layer 20 further comprises a damping reduction layer 26 over the template layer 24. In certain embodiments, the damping reduction layer 26 comprises a nickel aluminum alloy, such as nickel in an atomic percent content in a range from 20% to 80% and aluminum in an atomic percent content in a range from 20% to 80%. In certain embodiments, the damping reduction layer 26 provides low damping of the SPL 30 and short spin diffusion length to reduce the critical current Jc for magnetization reversal of the SPL 30. In certain embodiments, a nickel aluminum alloy comprises a BCC material, that when formed over the HCP material of the template layer 24 of ruthenium or ruthenium alloy, provides a good surface for growth or interfacing with the SPL 30, such as growth of a FCC layer, a BCC layer, or Heusler alloy layer having low structural defects. In certain embodiments, the damping reduction layer 26 is formed to a thickness in a range from 1 nm to 6 nm.

A ruthenium or ruthenium alloy layer in direct interface with the SPL 30 undesirably increases ferromagnetic damping factor α of the SPL 30 due to a spin pumping effect. A high damping factor α of the SPL 30 requires an undesirable high critical current Jc for magnetization reversal of the SPL 30. A high critical current Jc reduces the reliability of the STO device 230. In certain embodiments, the damping reduction layer 26 separates the template layer 24 comprising ruthenium or a ruthenium alloy from the SPL 30 and reduces damping of the SPL 30 and reduces the critical current Jc for magnetization reversal of the SPL 30.

The seed layer 20 may further comprise one or more optional additional layers 29 between the template layer 24 and the main pole 220.

Figure 6:
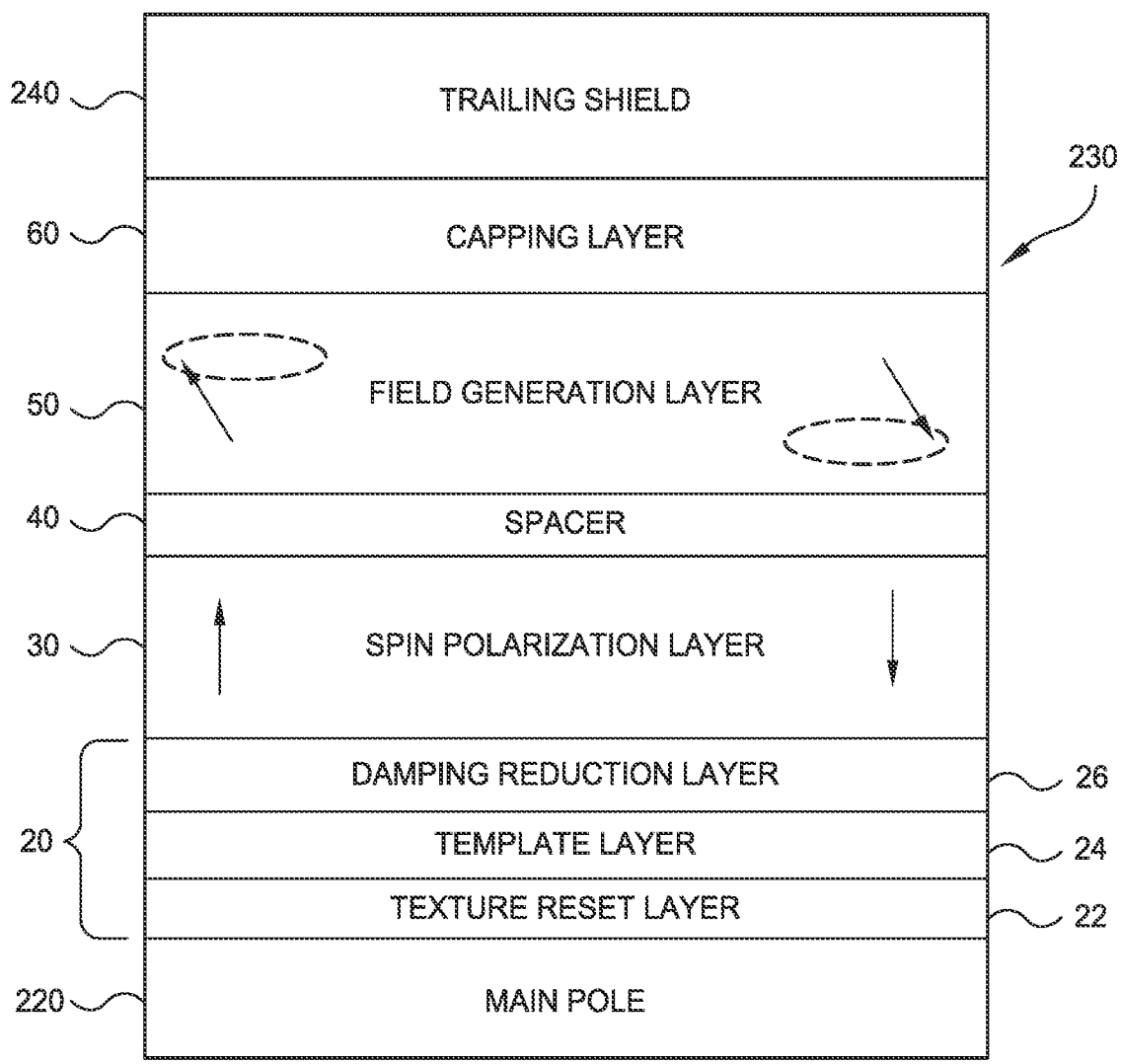
FIG. 6 is a schematic plan view of an air bearing surface of yet another embodiment of a magnetic recording head of FIG. 2 and FIG. 3 in which the seed layer of the magnetic recording head comprises a texture reset layer, a template layer, and a damping reduction layer.

FIG. 6 is a schematic plan view of an air bearing surface of yet another embodiment of a STO device 230 of FIG. 2 and FIG. 3 in which the seed layer 20 of the STO device 230 comprises a texture reset layer 22, a template layer 24, and a damping reduction layer 26. The STO device 230 comprises a spin polarization layer (SPL) 30, a spacer layer 40, and a field generation layer (FGL) 50 similar to those discussed in reference to FIG. 4 and FIG. 5.

A template layer 24 may not grow well on the random texture surface of the main pole 220 comprising small grain CoFe or CoFeNi magnetic body-centered cubic (BCC) materials in a random texture. A texture reset layer 22 provides a good surface for growth of the template layer 24. A texture reset layer 22 comprising a tantalum alloy also provides reduced joule heating of the STO device 230 due the lower resistance of a tantalum alloy in comparison to pure or substantially pure tantalum. The texture reset layer 22 of FIG. 6 comprises one or more of the characteristics of the texture reset layer 22 of FIG. 4.

The template layer 24 provides good growth of a SPL 30 with reduced structural defects. The template layer 24 and the damping reduction layer 26 of FIG. 6 comprises one or more of the characteristics of the template layer 24 and the damping reduction layer 26 of FIG. 5. The damping reduction layer 26, such as a nickel aluminum alloy, reduces the damping and critical current Jc for magnetization reversal of the SPL 30. For example, the nickel aluminum alloy of the damping reduction layer 26 is a BCC material which grows well over the HCP material of ruthenium or ruthenium alloy of the template layer 24. A SPL 30 grows well over the damping reduction layer 26. For example, a SPL 30 comprising a nickel iron (NiFe) alloy layer is a FCC material that grows well over a BCC material of nickel aluminum alloy. For example, a SPL 30 comprising a Heusler alloy, such as CoMnGe, grows well over a BCC material of a nickel aluminum alloy.

In certain embodiments, the STO device 230 comprises a texture reset layer 22 of a tantalum alloy layer over the main pole 220 comprising small grain magnetic body-centered cubic (BCC) materials in a random texture. The tantalum alloy layer provides a texture break from the BCC random texture of the main pole 220 and has a nano-crystalline structure with a lower resistance than pure or substantially pure tantalum. A template layer 24 comprising a ruthenium or a ruthenium alloy layer having a HCP structure is formed over the nano-crystalline structure of the tantalum alloy layer. A damping reduction layer 26 comprising a nickel aluminum alloy having a BCC structure with a monocrystalline or polycrystalline texture is formed over the ruthenium or ruthenium alloy layer. A SPL 30 having a FCC structure is formed over the BCC structure with a monocrystalline or polycrystalline texture of the nickel aluminum alloy layer. The STO device 230 has low joule heating due to low overall resistance of the seed layer 20 comprising a tantalum alloy, a ruthenium or ruthenium alloy layer over the tantalum alloy, and a nickel aluminum alloy layer over the ruthenium or ruthenium alloy layer. The STO device 230 has reduced critical current Jc for SPL reversal due to low damping of the SPL 30 by having a damping reduction layer 26 between the ruthenium or ruthenium alloy layer and the SPL 30. The STO device 30 has a good texture for formation of the SPL 30 with reduced structure defects for lower coercively, lower critical current, and better yield due to the nano-crystalline structure layer, HCP structure layer, and BCC structure layer with a monocrystalline or polycrystalline texture of the seed layer 20 bridging the random texture BCC material of the main pole 220 and the structure of the SPL 30. For example, the SPL 30 may comprise one or more layers of a face centered cubic (FCC) material layer, a Heusler alloy layer, combinations thereof, and multiple layers thereof.

In certain embodiments, the texture reset layer 22, the template layer 24, and the damping reduction layer 26 are each formed to a thickness in a range from 1 nm to 6 nm. In certain embodiments, the total thickness of the seed layer 20 comprising the texture reset layer 22, the template layer 24, and the damping reduction layer 26 is in a range from 3 nm to 12 nm.

In certain embodiments, the seed layer 20 comprising a texture reset layer 22 (such as a tantalum alloy layer), a template layer 24 (such as a ruthenium or ruthenium alloy layer), and a damping reduction layer 26 (such as a nickel aluminum layer) as a whole has one or more of the following characteristics: low joule heating due to low overall resistance of the seed layer 20; reduced critical current Jc for SPL reversal due to low damping of the SPL 30 and due to short spin diffusion length from direct torque from the main pole 220; and good texture for formation of the SPL 30 with reduced structure defects for lower coercively, lower critical current, and better yield.

The STO device 230 of FIGS. 4, 5, and 6 may be formed by deposition processes, such as physical vapor deposition, and patterning processes. For example, the STO device 230 may be formed by depositing the seed layer 20 over the main pole 220, depositing the SPL 30 over the seed layer 20, depositing the spacer layer 40 over the SPL 30, and depositing the FGL 50 over the spacer layer 40. In addition to physical vapor deposition, deposition process may also include electrochemical deposition processes, such as electroplating and electroless deposition, chemical vapor deposition processes, atomic layer deposition processes, other suitable deposition process, and combinations thereof.

In other embodiments, the STO device 230 of FIG. 4, FIG. 5, and FIG. 6 may be stacked in other directions. For example, when an electron current flow through the STO device 230 from the trailing shield 240 to the main pole 220, the STO device 230 comprises a capping layer under the trailing shield 240, a SPL under the capping layer, a spacer layer under the SPL, the FGL under the spacer layer, and an optional seed layer under the FGL.

EXAMPLES

The following are examples to illustrate various embodiments of a STO device. For illustration purposes, these examples will be described in reference to a STO device 230 described in FIG. 4, FIG. 5, and FIG. 6. These examples are not meant to limit the scope of the claims unless specifically set forth in the claims.

Examples 1-3

In Examples 1-3, the three layers of the seed layer were deposited to a similar thickness and the SPL layer was deposited to a similar thickness and with a similar nickel iron composition.

In Examples 1-2, a seed layer consisting essentially of a copper layer, a tantalum layer on the copper layer, and a ruthenium layer was formed over a substrate. A spin polarization layer comprising a bilayer of nickel iron and cobalt was formed over the seed layer.

In Example 3, a seed layer consisting essentially of a nickel iron tantalum alloy layer, a ruthenium layer on the nickel iron tantalum alloy layer, and a nickel aluminum alloy layer on the ruthenium layer was formed over a substrate. A spin polarization layer comprising nickel iron was formed over the seed layer.

The properties of the examples are set forth in TABLE I.

TABLE 1

| Ex. | Seed | RA | Vjump (mV) | Jc (MA/cm2) |
| --- | --- | --- | --- | --- |
| 1 | Cu/Ta/Ru | 0.0224 | 11.6 | 52.0 |
| 2 | Cu/Ta/Ru | 0.0228 | 11.8 | 51.7 |
| 3 | NiFeTa/Ru/NiAl | 0.0190 | 7.3 | 38.2 |

Examples 1-3 had similar high saturation flux density (Bst) (the product of magnetic moment Bs and thickness of the SPL). Example 3 had a resistance times area product (RA) of about 10% less than Examples 1 and 2. Example 3 had a critical current of about 25% less than Examples 1 and 2. Example 3 had a SPL flip bias voltage Vjump (mV) of about 35% less than Examples 1 and 2. The spin torque efficiency of the SPL is inversely proportional to the SPL flip bias voltage Vjump (mV). Example 3 has a higher spin torque efficiency for the STO than Examples 1 and 2.

Examples 4-7

In Examples 4-5, each sub-layer of the seed layer was deposited to a similar thickness. The SPL layer was deposited to a similar thickness and with a similar nickel iron composition. In Example 4, a seed layer consisting essentially of a copper layer, a tantalum layer on the copper layer, and a ruthenium layer on the tantalum layer was formed. A spin polarization layer comprising nickel iron was formed over the seed layer. In Example 5, a seed layer consisting essentially of a copper layer, a tantalum layer on the tantalum layer, a ruthenium layer on the tantalum layer, and a nickel aluminum alloy layer on the ruthenium layer was formed. A spin polarization layer comprising nickel iron was formed on the seed layer.

In Examples 6-7, each sub-layer of the seed layer was deposited to a similar thickness. The SPL layer was deposited to a similar thickness and with a similar nickel iron composition. In Example 6, a seed layer consisting essentially of a chromium layer, a tantalum layer on the chromium layer, and a ruthenium layer on the tantalum layer was formed. A spin polarization layer comprising nickel iron was formed on the seed layer. In Example 7, a seed layer consisting essentially of a chromium layer, a tantalum layer on the chromium layer, a ruthenium layer on the tantalum layer, and a nickel aluminum alloy layer on the ruthenium layer was formed. A spin polarization layer comprising nickel iron was formed over the seed layer.

Figure 7:
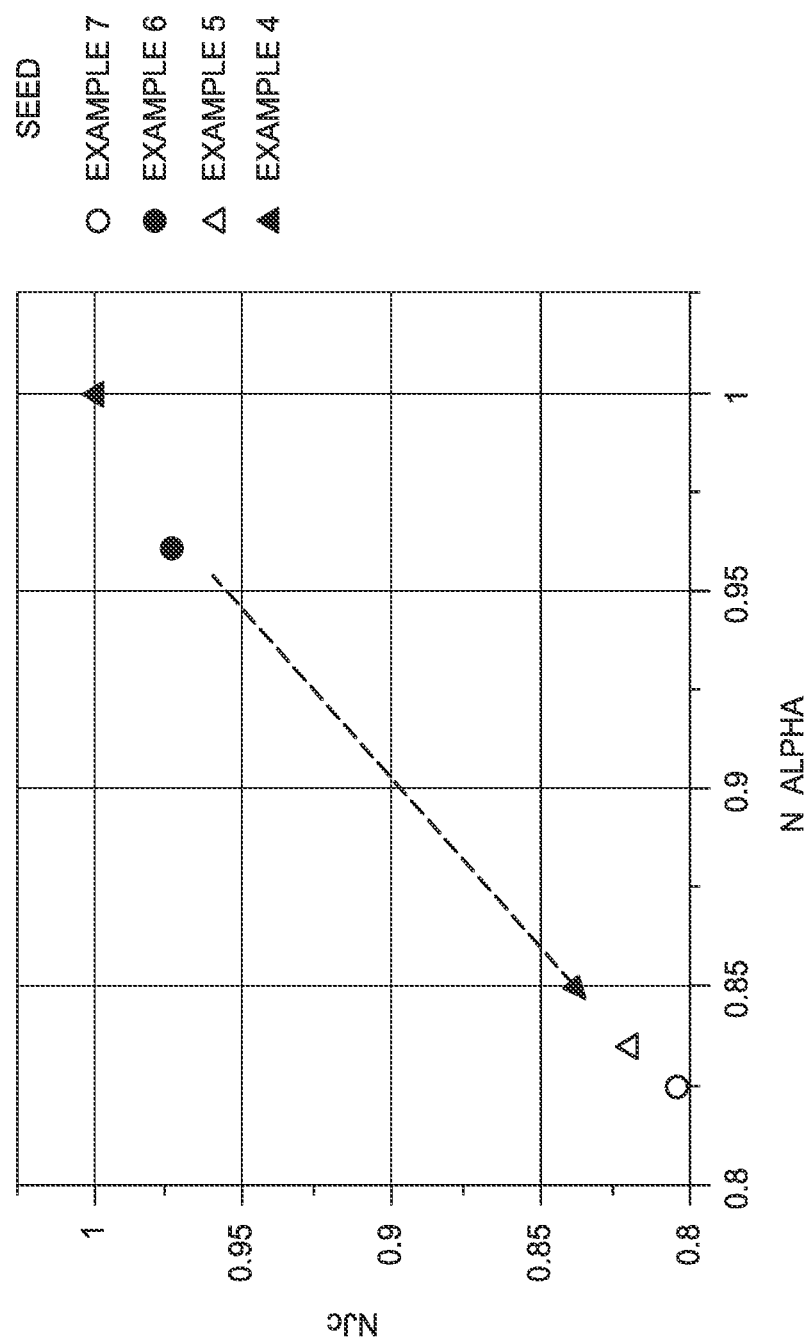
FIG. 7 is a graph of the normalized critical current Jc over saturation flux density Bst versus the normalized ferromagnetic resonance damping factor $\alpha$ for Examples 4-7.

FIG. 7 is a graph of normalized critical current Jc over saturation flux density Bst versus the normalized ferro-magnetic resonance damping factor α for Examples 4-7. The ferro-magnetic resonance damping factor α in the SPL of Example 5 was lower than Example 4 by reducing spin pumping from the seed layer to the SPL. The ferro-magnetic resonance damping factor α in the SPL of Example 7 was lower than Example 5 by reducing spin pumping from the seed layer to the SPL layer.

Certain embodiments of the seed layer provide low joule heating to the STO device due to low overall resistance of the seed layer. Certain embodiments of the seed layer provided reduced critical current Jc for SPL reversal due to low damping of the SPL and due to short spin diffusion length from direct torque from the main pole. Certain embodiments of the seed layer provide a good texture for formation of the SPL with reduced structure defects for lower coercively, lower critical current, and better yield.

Certain embodiments are directed to a magnetic recording device including a spin torque oscillator (STO) device in a microwave-assisted magnetic recording (MAMR) device. The STO device includes a seed layer, a spin polarization layer over the seed layer, a spacer layer over the spin polarization layer, and a field generation layer is over the spacer layer. In one embodiment, the seed layer comprises a tantalum alloy layer. In another embodiment, the seed layer comprises a template layer and a damping reduction layer over the template layer. In yet another embodiment, the seed layer comprises a texture reset layer, a template layer on the texture reset layer, and a damping reduction layer on the template layer.

Certain embodiments are directed to a microwave-assisted magnetic recording (MAMR) device comprising a main pole, a spin torque oscillator device, and a trailing shield over the spin torque oscillator device. The spin torque oscillator device includes a seed means. The seed means interfaces with the main pole and interfaces with a spin polarization layer of the spin torque oscillator device.

Certain embodiments are directed to a microwave-assisted magnetic recording (MAMR) device include a main pole, a spin torque layer, and a seed layer disposed between the main pole and the spin torque layer. The main pole includes a body-centered cubic (BCC) material with a random texture. The seed layer includes a nano-crystalline layer over the main pole, a hexagonal close packed (HCP) structure layer over the nano-crystalline layer, and a body-centered cubic (BCC) structure layer over the HCP structure layer.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
a main pole; and
a spin torque oscillator (STO), comprising:
a seed layer comprising a template layer and a damping reduction layer over the template layer, the template layer being disposed in contact with the main pole and the damping reduction layer, wherein the template layer comprises ruthenium or a ruthenium alloy, and wherein the damping reduction layer comprising a nickel aluminum alloy;
a spin polarization layer over the damping reduction layer;
a spacer layer over the spin polarization layer; and
a field generation layer over the spacer layer.

2. The magnetic recording head of claim 1, wherein the nickel aluminum alloy comprises an atomic percent content of nickel in an atomic percent content in a range from 20% to 80 and aluminum in a range from 20% to 80%.

3. The magnetic recording head of claim 1, wherein the spin polarization layer comprises a layer on the damping reduction layer, the layer selected from a group consisting of a nickel iron layer and cobalt manganese germanium layer.

4. The magnetic recording head of claim 1, wherein the damping reduction layer has face centered cubic structure.

5. The magnetic recording head of claim 1, wherein the field generation layer has face centered cubic structure or Heusler ordered phase structure interfacing with the damping reduction layer.

6. A data storage device comprising the magnetic recording head of claim 1.

7. The magnetic recording head of claim 1, wherein the spin polarization layer is disposed in contact with the damping reduction layer.

8. The magnetic recording head of claim 1, wherein the template layer further comprises chromium or titanium.

9. A magnetic recording head, comprising:
a main pole; and
a spin torque oscillator (STO) device, comprising:
a seed layer comprising:
a texture reset layer disposed on and in contact with the main pole, the texture reset layer comprising tantalum and one or more of nickel and iron, wherein the texture reset layer comprises an atomic percent content of tantalum in a range from 20% to 50%, wherein a sum of an atomic percent of the tantalum and the one or more of nickel and iron equals 100 percent;
a template layer on the texture reset layer, and a damping reduction layer on the template layer;
a spin polarization layer on the damping reduction layer;
a spacer layer over the spin polarization layer; and
a field generation layer over the spacer layer.

10. The magnetic recording head of claim 9, wherein the template layer comprises a material selected from the group consisting of a ruthenium or a ruthenium alloy.

11. The magnetic recording head of claim 9, wherein the damping reduction layer comprises a nickel aluminum alloy.

12. The magnetic recording head of claim 9, wherein the spin polarization layer is in contact with the texture reset layer.

13. The magnetic recording head of claim 9, wherein the texture reset layer comprises an atomic percent content of tantalum in a range from 25% to 35%.

14. The magnetic recording head of claim 9, wherein the texture reset layer comprises tantalum in an atomic percent content in a range from 20% to 50% and nickel in an atomic percent content in a range from 50% to 80%.

15. The magnetic recording head of claim 9, wherein the texture reset layer comprises tantalum in an atomic percent content in a range from 20% to 50% and iron in an atomic percent content in a range from 50% to 80%.

16. The magnetic recording head of claim 9, wherein the texture reset layer is a NiFeTa layer comprising tantalum in an atomic percent content in a range from 20% to 50%, nickel in an atomic percent content in a range from 1% to 75%, and iron in an atomic percent content in a range from 1% to 75%.

17. A data storage device comprising the magnetic recording head of claim 9.

18. The magnetic recording head of claim 9, wherein the texture reset layer has a thickness of about 1 nm to about 6 nm.

19. A magnetic recording head, comprising:
a spin torque oscillator (STO) device, comprising:
a seed layer comprising:
a texture reset layer comprising an atomic percent content of tantalum in a range from 20% to 50%:
a template layer on the texture reset layer, and
a damping reduction layer on the template layer;
a spin polarization layer on the damping reduction layer;
a spacer layer over the spin polarization layer; and
a field generation layer over the spacer layer, wherein the texture reset layer has a nano-crystalline surface interfacing with the spin polarization layer.

* * * * *